Feb. 3, 1970

A. R. LUDWIG 3,493,238

POWER RELEASED REMOVABLE COLLET

Filed May 14, 1968

INVENTOR
ALBERT R. LUDWIG
BY McNenny, Farrington,
Pearne & Gordon

ATTORNEYS

United States Patent Office 3,493,238
Patented Feb. 3, 1970

3,493,238
POWER RELEASED REMOVABLE COLLET
Albert R. Ludwig, Cleveland, Ohio, assignor to
Zagar, Inc., a corporation of Ohio
Filed May 14, 1968, Ser. No. 729,020
Int. Cl. B23b 31/10, 31/30
U.S. Cl. 279—4                    5 Claims

ABSTRACT OF THE DISCLOSURE

A collet assembly comprises a collet surrounded by a coaxial collet clamp that is in turn surrounded by a coaxial air operated piston that tightens and loosens the collet clamp that is coupled for axial movement therewith upon each reversal of the piston, with the coupling in one direction being established by a thrust bearing and in the other by an interference fit between the collet clamp and the piston.

---

The invention provides an improved collet assembly which may be readily assembled and dissassembled and which provides for positive tightening and release of the collet. The arrangement is adaptable to automatic or manual rotative indexing of the collet, and to automatic feed-through of workpieces by gravity.

These and other objects and advantages of the invention will become more apparent from the following description of an embodiment thereof, together with the accompanying drawings.

Figure 1:
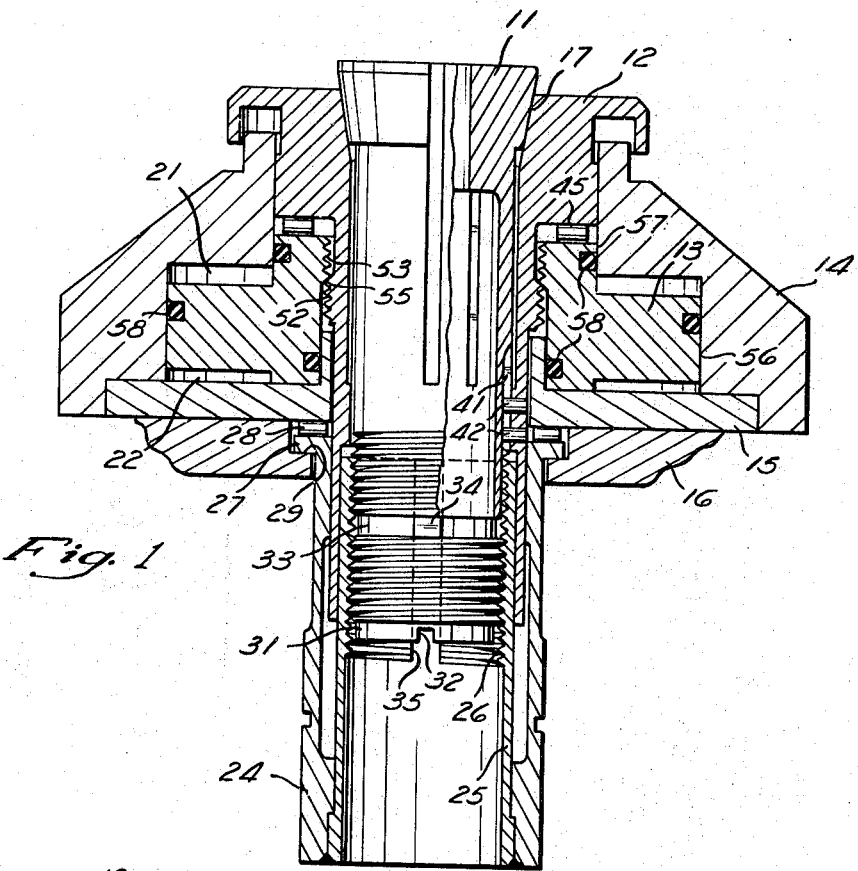
FIGURE 1 is a cross-sectional view, with certain parts being partly broken away, showing part of a fixture that embodies the invention.

In the illustrated fixture, a collet 11 is adapted to be tightened around a workpiece (not shown) by a coaxial collet clamp or bushing 12 that in turn is actuated by a coaxial open-centered double-acting pneumatically operated piston.

The fixture includes frame and housing members 14, 15, and 16 that may be stationary, may be mounted on or form part of a slide table or the like, or may otherwise constitute a generally unitary frame and housing means. The members 14–16 may be releasably assembled by means of tie-bolts, or other fastening means (not shown).

The frame members 14 and 15 together with the piston 13 define pneumatic cylinder chambers 21 and 22.

The collet 11 is mounted in collet spindle means comprising a flanged outer sleeve or spindle 24 which is fixed to an inner spindle sleeve 25 that is internally threaded as at 26.

The flange 27 of the outer sleeve 24 is supported between the frame members 15 and 16 by suitable bearing means such as the thrust bearing 28 and the bearing face 29.

Figure 3:
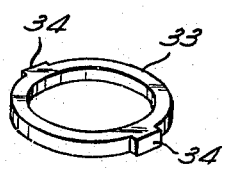
FIGURE 3 illustrates a lock washer employed in the apparatus of FIGURE 1, and although the lock washer is of no particular importance to the invention, its illustration is helpful in quickly grasping the illustration of FIGURE 1.

A collet locknut 31 is received in the threads 26 and is inserted and removed by means of a tool (not shown) temporarily inserted through the lower end of the collet spindle into a tool-receiving slot 32. A lock washer 33 (FIGURE 3) is engaged between the inner end of the collet 11 and the locknut 31. The ears 34 of the lock washer 33 engage in the slots 35 cut in the threads 26 of the inner sleeve 25.

A slot 41 is formed in the collet 11 and receives the keys or pins 42 fixed on the clamp or bushing 12 so that the collet 11 and the collet clamp 12 are thereby connected for co-rotation and for sliding movement with respect to each other in axial directions whereby the clamp 12 may tighten and loosen the collet 11 by sliding engagement at the wedging interface 17.

The collet clamp 12 and piston 13 are connected for movement back and forth together in axial directions under the driving force of the piston 13 with however a slight lost motion. One limit of the lost motion is established by thrust bearing means such as the thrust bearing 45 between the piston 13 and collet clamp 12.

The other limit of the lost motion is established by interfering means associated with the piston 13 and with the collet clamp 12, such interfering means respectively being threads 53 associated with the piston 13, and threads 52 associated with the piston 12.

Figure 2:
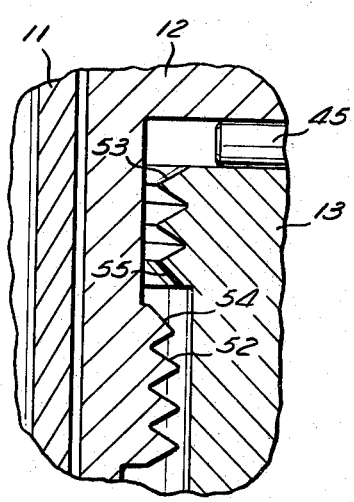
FIGURE 2 is an enlarged view of a portion of FIGURE 1, with the parts in a different position.

In the clamped position illustrated in FIGURE 2 the piston 13 is driven by air pressure within the chamber 22, and the thrust bearing 45 transmits clamping force to the collar 12 and permits relative rotation between the collar 12 and the piston 13 even during application of the clamping force. In this position of the parts, there is a slight space of, say, an eighth of an inch between the 45° faces 54 and 55 associated respectively with the threads 52 and 53.

When chamber 22 is relieved and air pressure is fed to chamber 21, and after slight lost motion between clamp 12 and piston 13 during which the space between 45° faces 54 and 55 disappears, the parts reach the unclamped position shown in FIGURE 1, and the 45° faces engage to positively drive the clamp 12 in the unclamping direction to loosen the collet 11, and allow a workpiece (not shown) to drop by gravity through the center of the collet and out the bottom of the fixture.

Suitable manual or automatic indexing means such as ratchet drives or the like (not shown) may be drivingly connected to the collet spindle means as for example by intermittent advancement of a ratchet wheel (not shown) keyed to the sleeve 24. The direction of feed or advancement of any indexing means may be in the unthreading direction of the threads 52 with respect to the threads 53 in the assembled condition shown in the drawings to remove the possibility of engagement of the threads 52 into the threads 53 if the indexing means is advanced while the parts are in the unclamped position.

The air feed to and from the chambers 21 and 22 may be controlled by any conventional solenoid-operated four-way valve (not shown).

After loosening of the locknut 31, the collet 11 may be removed by turning it out of the threads 26 by means of the keyed connection 41, 42 between the collar 12 and the collet 11. When unthreading of the collet 11 is completed, it may simply be lifted from the fixture.

The clamping collar 12 may also be removed by interengaging the threads 52 and 53 and threading the threads 52 through the threads 53.

These operations are reversed to install the parts. The The collet clamp is first installed, and then the slot or keyway 41 of the collet is aligned with the keys or pins 42 and the collet and the clamping collet are turned to thread the collet into the threads 26.

To obtain best clamping relationship with a workpiece a sample workpiece is inserted in the collet, and the clamping collar 12 is turned by hand until the workpiece is lightly held. The clamping collar is then backed off slightly to ease the insertion of workpieces. This establishes the release position of the collet and the proper degree of engagement of the collet within the threads 26 for the particular workpiece.

Next, pressure is applied to chamber 22 to clamp the workpiece in the collet. This tends to hold the collet firmly while the locknut 31 is tightened against the lower end of the collet.

It is to be noted that the chamber 21 is defined by mating or telescoping fits between the piston 13 and the housing member 14 at a radially outer annular interface 56 and at a radially intermediate annular interface 57. The threads 53 which comprise the interference fit means associated with the piston 13 are located radially inwardly of the radially intermediate annular interface 57.

O-ring seals 58 are desirably employed at the several annular interfaces that seal the piston chambers 21 and 22.

The invention is not restricted to imitation or inclusion of all details and relationships of the illustrated embodiment.

What is claimed is:

1. In a collet assembly, a collet, a collet clamp surrounding the collet, an open-centered double-acting pneumatic piston surrounding the collet clamp, housing means surrounding the piston and defining therewith pneumatic cylinder chambers for back and forth actutaion of the piston, collet spindle means, means for removably fixing the collet in the spindle means, the collet and collet clamp being connected for co-rotation and for sliding movement with respect to each other in axial directions, the collet clamp and piston being connected for movement together back and forth in axial directions under the driving force of the piston, bearing means between the piston and collet clamp for transmitting clamping force in one axial direction to said collet clamp and for permitting relative rotation of said collet clamp and piston even during application of collet clamping forces, and interfering means associated with the piston and with the collet clamp for transmitting unclamping force in the other axial direction to said collet clamp, the interfering parts of said interfering means being shaped to pass through each other to release the interference upon certain manipulation of said collet clamp.

2. A device as in claim 1, at least one of said pneumatic cylinder chambers being defined b ytelescoping fits between said piston and said housing means at a radially outer annular interface and at a radially intermediate annular interface, and the part of said interfering means that is associated with said piston being located radially inwardly of said radially intermediate annular interface.

3. In a collet fixture, a collet, a collet clamp surrounding the collet, an open-centered double-acting pneumatic piston surrounding the collet clamp, housing means surrounding the piston and defining therewith pneumatic cylinder chambers for back and forth actuation of the piston, collet spindle means, means for removably fixing the collet in the spindle means, the collet and collet clamp being connected for co-rotation and for sliding movement with respect to each other in axial directions, the collet clamp and piston being connected for movement together back and forth in axial directions under the driving force of the piston with however a lost motion upon reversal of the direction of actuation of the piston, bearing means between the piston and collet clamp for transmitting clamping force in one axial direction to said collet clamp after establishing one limit of the lost motion and for permitting relative rotation of said collet clamp and piston even during application of collet clamping forces, and interfering means associated with the piston and with the collet clamp for transmitting unclamping force in the other axial direction to said collet clamp after establishing the other limit of said lost motion.

4. A device as in claim 3, the interfering parts of said interfering means being shaped to pass through each other to release the interference upon certain manipulation of said collet clamp.

5. A device as in claim 4, at least one of said pneumatic cylinder chambers being defined by telescoping fits between said piston and said housing means at a radially outer annular interface and at a radially intermediate annular interface, and the part of said interfering means that is associated with said piston being located radially inwardly of said radially intermediate annular interface.

References Cited

UNITED STATES PATENTS 3,208,759  9/1965  Firestone _____ 279—4

FOREIGN PATENTS 943,494  12/1963  Great Britain.

OTHELL M. SIMPSON, Primary Examiner

DONALD D. EVENSON, Assistant Examiner